US010259047B2

(12) United States Patent
Badalians et al.

(10) Patent No.: US 10,259,047 B2
(45) Date of Patent: Apr. 16, 2019

(54) MACHINING APPARATUS AND METHODS FOR PERFORMING MACHINING OPERATIONS

(71) Applicants: Andre Hosepi Badalians, Tehran (IR); Alex Hosepi Badalians, Tehran (IR)

(72) Inventors: Andre Hosepi Badalians, Tehran (IR); Alex Hosepi Badalians, Tehran (IR)

( * ) Notice: Subject to any disclaimer, the term of this patent is extended or adjusted under 35 U.S.C. 154(b) by 369 days.

(21) Appl. No.: 15/163,944

(22) Filed: May 25, 2016

(65) Prior Publication Data
US 2017/0341151 A1 Nov. 30, 2017

(51) Int. Cl.
*B23B 5/26* (2006.01)
*B23B 13/02* (2006.01)
*B23B 5/08* (2006.01)

(52) U.S. Cl.
CPC .......... *B23B 5/08* (2013.01); *B23B 2220/123* (2013.01); *B23B 2226/61* (2013.01); *B23B 2260/026* (2013.01); *B23B 2260/09* (2013.01); *B29C 2793/00* (2013.01)

(58) Field of Classification Search
CPC .......... B23B 2220/123; B23B 2226/61; B23B 2260/026; B23B 2260/09; B23B 5/08; B29C 2793/00
See application file for complete search history.

(56) References Cited

U.S. PATENT DOCUMENTS

| 2,611,173 | A | | 9/1952 | Schultz, Jr. | |
|---|---|---|---|---|---|
| 4,122,735 | A | | 10/1978 | Evers | |
| 5,031,490 | A | * | 7/1991 | Grossmann | B23Q 7/045 29/36 |
| 6,619,670 | B2 | | 9/2003 | Alberici et al. | |
| 7,134,369 | B1 | * | 11/2006 | Stevens | B23B 13/04 82/124 |
| 8,322,257 | B2 | * | 12/2012 | Schaerer | B21D 43/006 414/14 |
| 9,186,738 | B2 | * | 11/2015 | Mall | B23F 23/04 |
| 9,533,355 | B2 | * | 1/2017 | Esser | B23B 31/1269 |
| 2006/0266172 | A1 | * | 11/2006 | Greuel | B23B 5/12 82/149 |
| 2011/0177925 | A1 | * | 7/2011 | Mayr | B23Q 1/4876 483/44 |

(Continued)

FOREIGN PATENT DOCUMENTS

WO    WO 1989003266    4/1989

*Primary Examiner* — Sara Addisu

(57) ABSTRACT

Disclosed is a multiple machining apparatus for, upon receiving a plastic cylindrical work piece therewithin, performing multiple machining operations thereon. The apparatus includes a rotary fixture capable of rotation; the rotary fixture includes a proximal means for snugly holding a proximal portion of the work piece, and a distal means for holding substantially the rest of the portion of the work piece. The apparatus further consists of a movable table with a blade holder for holding a plurality of blades, each of which corresponding to a machining operation, the movable table and thereby the blade holder is capable of movement along X, Y and Z axes. The apparatus performs multiple machining operations on the work piece by virtue of the rotation of the rotary fixture, rotation of the blades, and the movement of the movable table, working against the rotating work piece.

11 Claims, 14 Drawing Sheets

(56) References Cited

U.S. PATENT DOCUMENTS

2011/0179918 A1* 7/2011 Baumann ............... B23B 7/06
  82/147
2011/0277603 A1* 11/2011 Uchimura ............... B23B 5/08
  82/159
2013/0061726 A1* 3/2013 Katsu ..................... B23B 23/00
  82/1.11

* cited by examiner

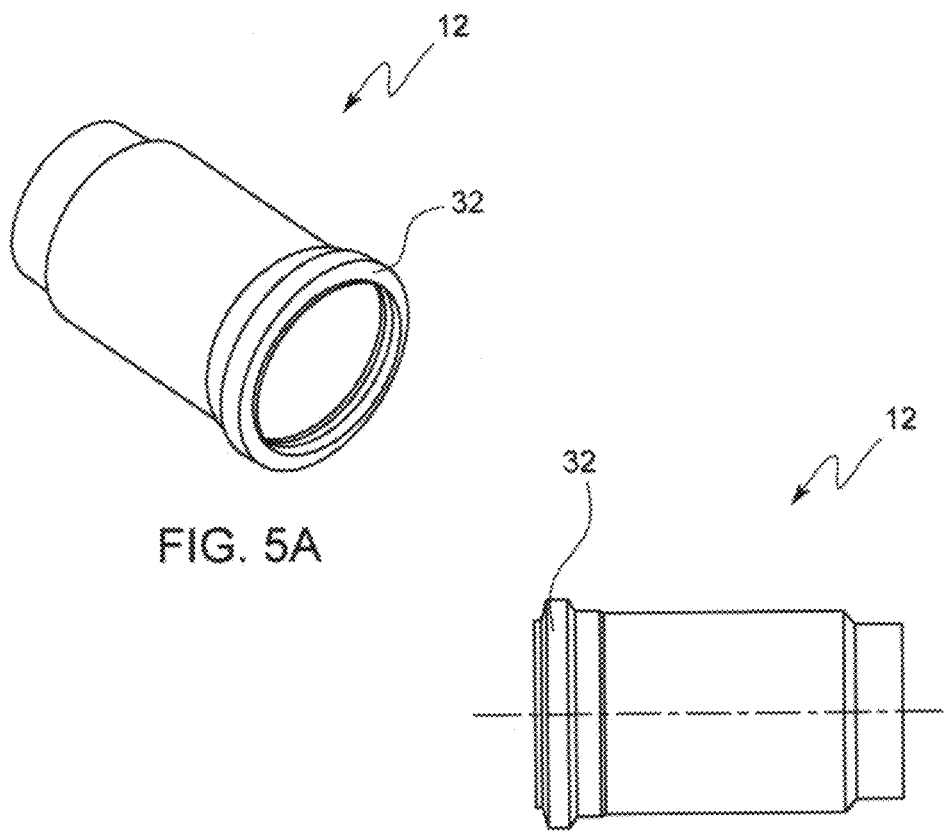
FIG. 5A
FIG. 5B
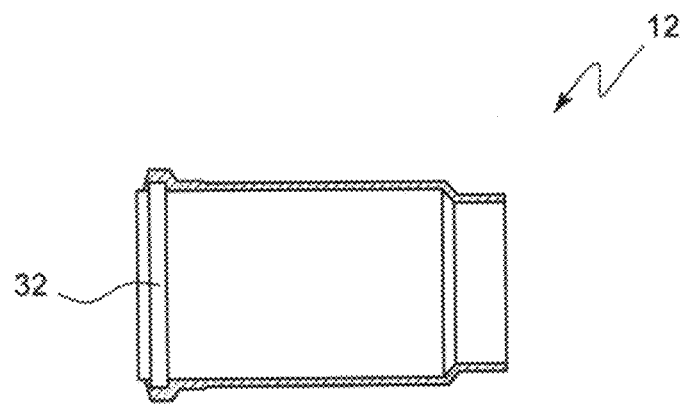
FIG. 5C

MACHINING APPARATUS AND METHODS FOR PERFORMING MACHINING OPERATIONS

BACKGROUND

Subjecting relatively softer, plastic work pieces to machining operations, such as, turning, line boring, knurling, etc., constitutes a challenging job on many fronts. For instance, plastic work pieces, when subjected to machining operations tend to get overheated, resulting in their deformation. To combat this overheating issue, coolants were introduced. Although coolants kept the rising temperatures at bay, they affect the material consistency of the work pieces resulting in the production of inferior quality products that lack durability. Secondly, end cutting of work pieces is another challenge as the apparatuses known in the art do not factor in the change in dimensions of the finished work piece.

In another instance, as plastic work pieces are not as rigid as the metal ones, subjecting them to the aforementioned machining operations would cause them to vibrate. This vibration might result in leaving trace marks on the surface of the work pieces. Not only are these trace marks unattractive from a customer standpoint, but when these products are employed for water works, leaks tend to occur through these marks. In yet another instance, although the apparatuses known in the art are designed to carry out more than one machining operation on the work piece, they require an operator's intervention between two consecutive machining operations for the work piece which requires hiring of skilled operators, ultimately resulting in the increased cost of production and the increased possibility of human error.

Therefore, there exists a need in the art for a reliable and efficient machining apparatus that is expressly designed for the volume production of softer plastic materials that overall is easier to operate and provides improved quality over existing machines and methods and also helps in reducing the cost of production.

SUMMARY OF THE INVENTION

The present invention comprises a multiple machining apparatus for performing multiple machining operations on relatively softer, cylindrical injection-molded plastic work pieces. The machining operations include turning, line boring, internal knurling, and end cutting. Notably, the machining operations are performed on a work piece such that, no manual intervention, such as, resetting, is required to be carried out by an operator between two consecutive machining operations. This eliminates the necessity of having a skilled operator carrying out the apparatus' operations. The apparatus is further designed to nullify the vibrations of the work pieces as they are subjected to the machining operations yielding an output that is clean, neat and devoid of any trace marks. Upon completion of the machining operations, in order to perform the final end cut on the work piece, the apparatus is configured to measure the length of the machined product from the beginning thereof (factoring in the shrinkage or the stretching of the work piece) before proceeding to perform the aforementioned end cut.

The apparatus comprises a stationary table, a movable table facing the stationary table and a control panel for enabling an operator to perform the operations of the apparatus. The stationary table comprises a rotary fixture for snugly and firmly receiving the work piece therewithin. The rotary fixture comprises a circular needle bearing within which, a circular bush resides wherein, the work piece is adapted to be snugly received within the thorough bush hole. More particularly, the work piece is received within the bush such that, bush holds the work piece at a proximal portion thereof. Notably, the bush is made of Teflon material, which is soft so that a snug, tight, and vibration-free fit is achieved between the work piece and the bush. The rotary fixture further comprises three radially-movable jaws for holding the rest of the portion of the work piece. More particularly, the jaws are configured to be movable between a lock and an unlock position wherein, in the lock position, the jaws snugly abut the outer surface of the work piece and wherein, in the unlock position, the work piece is free of the jaws. The jaws are operatively coupled to a rotary motor for rotating the jaws and thereby the work piece engaged therewith in both clockwise and anti-clockwise directions. Notably, the firm bracing of the work piece by the bush and the jaws prevent the work piece from shaking when being subjected to the machining operations.

The movable table comprises a blade holder for holding a plurality of blades that work against the work piece resulting in the subtractive manufacturing thereof. The blade holder comprises a pair of elongate top and bottom rectangular bars, each of which anchored and extending from the movable table. The free end of the top and bottom bars are closed thereby rendering the blade holder longitudinally closed, but laterally thoroughly open. Each of the top and bottom bars comprises a plurality of aligned, thorough vertical holes, which enable for more than one blade to be anchored therebetween for simultaneously performing machining operations on the work piece. Notably, the movable table is configured to be movable along X, Y and Z axes. The movement of the movable table, as enabled by one or more driving means, is controlled from the control panel by the operator.

The advantages of the apparatus of the present invention include:
1. Capability for outputting solid and stable plastic and flexible parts without deformation.
2. Capability for conducting three machining operations by one time input of the work piece into the apparatus and without necessitating human intervention (such as, resetting the work piece) between two consecutive machining operations.
3. The apparatus is designed such that, a work piece do not vibrate while undergoing the aforementioned machining operations.
4. The apparatus makes the end cut at a point, which is arrived at by measuring the length of the finished work piece from its extremity.
5. Accommodation of work pieces of various diameters and materials.
6. Cleaner products on account of the absence of vibration.
7. No requirement for skilled operators.
8. Decrease in the cost of production.
9. Faster rate of production on account of minimum human intervention.
10. Decrease in waste generation.

One aspect of the present disclosure is directed to an apparatus capable of performing multiple machining operations on a plastic cylindrical work piece, the apparatus comprising: (a) a rotary fixture capable of rotation, the rotary fixture comprising: (i) a proximal means comprising a circular needle and a circular bush, wherein the proximal means snugly holds a proximal portion of the work piece; and (ii) a distal means comprising a plurality of jaws capable of radial displacement, wherein said distal means holds substantially the rest of the portion of the work piece; and (b) a movable table comprising a blade holder for holding a plurality of blades, each of which corresponding to a machining operation and the movable table, and wherein the blade holder is capable of movement along x, y and z axes; wherein upon receiving a plastic cylindrical work piece, the apparatus performs multiple machining operations on the work piece by virtue of the rotation of the rotary fixture, rotation of the blades, and the movement of the movable table, working against the rotating work piece; further wherein the apparatus is configured such that no manual input is required between two consecutive machining operations.

In one embodiment, the rotary fixture is powered by a motor. In another embodiment, the rotary fixture is rotatable in both clock and counter-clock-wise directions. In one embodiment, the circular bush comprises a through hole for snugly and firmly receiving the work piece therethrough, with the bush holding the proximal portion and wherein the bush is held by the bearing and is made out of a resilient material, and further wherein the circumferential surface of the hole is resilient. In one embodiment, the bush is made of Teflon. In another embodiment, the outer circumferential surface of the bush in the direction from the blade holder to the rotary fixture is downwardly slanted and wherein, the inner circumferential surface of the bearing in the direction from the blade holder to the rotary fixture is correspondingly downwardly slanted; wherein the slanted surfaces prevent the bush from coming out of the bearing as the work piece is being introduced into the hole. In one embodiment, the plurality of jaws of the distal means holds the work piece, upon being received within the bush.

In one embodiment of the present disclosure, the movable table further comprises an insertion assembly disposed over the blade holder for pushing the work piece into the bush hole, the insertion assembly comprising: (a) an insertion hub; (b) a pair of insertion members, each of which comprising: (i) an elongate insertion rod hingedly coupled to the insertion hub, the insertion rod adapted to be angularly movable between an active position, where the insertion rod is perpendicular to the length of the apparatus, and an inactive position, where the insertion rod is parallel to the length of the apparatus; and (ii) an insertion plate disposed at the free end of the insertion rod, such that the outer surface of the insertion plate is vertically disposed; and (c) an insertion jack for powering the insertion hub, wherein upon the activation of the insertion jack, the insertion rods move from the inactive position to an active position; wherein, upon the activation of the insertion assembly and the movable table, the movable table moves horizontally until the insertion plates push the work piece into the bush hole until the bush hole holds the proximal portion of the work piece. In one embodiment, one proximal extremity of the work piece terminates in a circumferential flange.

In another embodiment of the present disclosure, the movable table further comprises an ejection assembly disposed over the blade holder, the ejection assembly comprising: (a) an ejection hub; (b) a pair of ejection members, each of which comprising: (i) a vertical rod; and (ii) a pair of top and bottom support rods for supporting the vertical rod between the distal extremities thereof, the proximal extremity of the top support rod is hingedly coupled to the ejection hub while the proximal extremity of the bottom support rod is also hingedly coupled for allowing free angular movement as driven by the angular movement of the top support rod, and the pair of top and bottom support rods adapted to be angularly movable between an active position, where the vertical rod is closer to the longitudinal axis of the apparatus, and an inactive position, where the vertical rod is further from the longitudinal axis of the apparatus; and (c) an ejection jack for powering the ejection hub wherein, upon the activation of the ejection jack, the vertical rods move closer to one another; wherein, upon the activation of the ejection assembly and the movable table, the movable table moves horizontally until a predetermined position at which point, the vertical rods move into the active position whereby, the vertical rods hold the work piece whereafter the work piece is pulled out of the bush hole upon the completion of the machining operations.

In one embodiment, the multiple machining operations comprises turning, line boring, end cutting, internal grooving, and knurling of the inner surfaces of the work piece. In another embodiment, for the end cutting purposes, the point at which the work piece is to be cut is determined by measuring the distance from the proximal extremity of the work piece. In one embodiment, the work piece comprises a wastewater joint, which includes a mouffe coupling. In one embodiment, the work piece comprises polyethylene.

One aspect of the present disclosure is directed to a machining apparatus capable of performing multiple machining operations on a plastic cylindrical work piece without the need for manual input between two consecutive machining operations, the apparatus comprising: (a) a rotary fixture capable of rotation, the rotary fixture comprising: (i) a proximal means for snugly holding a proximal portion of the work piece, the proximal means comprising: (1) a circular needle bearing; and (2) a circular bush comprising a through hole for snugly and firmly receiving the work piece therethrough, with the bush holding the proximal portion and wherein the bush is held by the bearing and is made out of a resilient material, and further wherein the circumferential surface of the hole is resilient; and (ii) a distal means comprising a plurality of jaws capable of radial displacement, wherein the jaws hold the work piece once the work piece is received within the bush; and (b) a movable table comprising a blade holder which holds a plurality of blades, wherein the blade holder is capable of movement along x, y and z axes; wherein, the work piece is a cylindrical polyethylene work piece and wherein upon receiving said polyethylene cylindrical work piece, the apparatus performs multiple machining operations on the work piece by virtue of the rotation of the rotary fixture, rotation of the blades, and the movement of the movable table, working against the rotating work piece; wherein the apparatus is configured such that no manual input is required between two consecutive machining operations.

In one embodiment, the outer circumferential surface of the bush in the direction from the blade holder to the rotary fixture is downwardly slanted and wherein, the inner circumferential surface of the bearing in the direction from the blade holder to the rotary fixture is correspondingly downwardly slanted; wherein the slanted surfaces prevent the bush from coming out of the bearing as the work piece is being introduced into the hole. In another embodiment, the multiple machining operations comprises turning, line boring, end cutting, internal grooving, and knurling of the inner surfaces of the work piece.

One aspect of the present disclosure is directed to a machining apparatus for performing multiple back-to-back machining operations on a polyethylene cylindrical work piece, the apparatus comprising: (a) a rotary fixture capable of rotation, the rotary fixture comprising: (i) a proximal means for snugly holding a proximal portion of the work piece, the proximal means comprising: (1) a circular needle bearing; and (2) a circular bush comprising a through hole for snugly and firmly receiving the work piece therethrough, with the bush holding the proximal portion and wherein the bush is held by the bearing and is made out of a resilient material, and further wherein the circumferential surface of the hole is resilient; and (ii) a distal means comprising a plurality of jaws capable of radial displacement, wherein the jaws hold the work piece; (b) a movable table capable of movement along x, y and z axes, the movable table comprising: (i) a blade holder for holding a plurality of blades, each of which is configured to a machining operation; (ii) an insertion assembly disposed over the blade holder for pushing the work piece into the bush hole, the insertion assembly comprising: (1) an insertion hub; (2) a pair of insertion members, each of which comprises: (a) an elongate insertion rod hingedly coupled to the insertion hub, the insertion rod adapted to be angularly movable between an active position, where the insertion rod is perpendicular to the length of the apparatus, and an inactive position, where the insertion rod is parallel to the length of the apparatus; and (b) an insertion plate disposed at the free end of the insertion rod such that, the outer surface of the insertion plate is vertically disposed; and (3) an insertion jack for powering the insertion hub wherein, upon the activation of the insertion jack, the insertion rods move from the inactive position to an active position, wherein, upon the activation of the insertion assembly and the movable table, the movable table moves horizontally till the insertion plates push the work piece into the bush hole till the bush hole holds the proximal portion of the work piece; and (iii) an ejection assembly disposed over the blade holder, for pulling the work piece out of the bush hole upon the completion of the machining operations, the ejection assembly comprising: (1) an ejection hub; (2) a pair of ejection members, each of which comprising: (a) a vertical rod; and (b) a pair of top and bottom support rods for supporting the vertical rod between the distal extremities thereof, the proximal extremity of the top support rod is hingedly coupled to the ejection hub while the proximal extremity of the bottom support rod is also hingedly coupled for allowing free angular movement as driven by the angular movement of the top support rod, the pair of top and bottom support rods adapted to be angularly movable between an active position, where the vertical rod is closer to the longitudinal axis of the apparatus, and an inactive position, where the vertical rod is further from the longitudinal axis of the apparatus; and (3) an ejection jack for powering the ejection hub wherein, upon the activation of the ejection assembly and the movable table, the movable table moves horizontally until a predetermined position at which point, the vertical rods move into the active position whereby, the vertical rods hold the work piece whereafter the work piece is pulled out of the bush hole upon the completion of the machining operations; wherein, the multiple machining operations are executed consecutively and without manual input and as the work piece, by virtue of the rotation of the rotary fixture, is rotated and with the blades, by virtue of the movement of the movable table, working against the rotating work piece.

In one embodiment, the outer circumferential surface of the bush in the direction from the blade holder to the rotary fixture is downwardly slanted and wherein, the inner circumferential surface of the bearing in the direction from the blade holder to the rotary fixture is correspondingly downwardly slanted; wherein the slanted surfaces prevent the bush from coming out of bearing as the work piece is being introduced into the hole. In one embodiment, the multiple machining operations comprises turning, line boring, end cutting, internal grooving, and knurling of the inner surfaces of the work piece.

One aspect of the present disclosure is directed to a method of performing multiple back-to-back machining operations on a polyethylene cylindrical work piece, the method comprising: (1) electronically pushing the work piece into a rotary fixture capable of rotation such that a proximal portion of the work piece is snuggly held therewithin, the rotary fixture comprising the proximal means comprising a circular needle bearing and a circular bush comprising a through hole for snugly and firmly receiving the work piece therethrough, with the bush holding the proximal portion and wherein the bush is held by the bearing and is made out of a resilient material, and further wherein the circumferential surface of the hole is resilient; (2) disposing a movable table opposite to the rotary fixture, the movable table capable of movement along x, y and z axes, the movable table comprising a blade holder for holding a plurality of blades, each of which is configured for a machining operation; (3) subjecting the work piece to rotation by the rotation of the rotary fixture; (4) subjecting a blade to movement by virtue of the movement of the movable table such that, the blade works against the rotation of the work piece resulting in the work piece being subjected to one or more machining operations resulting in subtractive manufacturing; and (5) electronically pulling the finished work piece out of the circular bush.

In one embodiment, the one or more machining operations comprise turning, line boring, end cutting, internal grooving, and knurling of the inner surfaces of the work piece. In another embodiment, for the end cutting purposes, the point at which the work piece is to be cut is determined by measuring the distance from the proximal extremity of the work piece. In one embodiment, the outer circumferential surface of the bush in the direction from the blade holder to the rotary fixture is downwardly slanted and wherein, the inner circumferential surface of the bearing in the direction from the blade holder to the rotary fixture is correspondingly downwardly slanted; wherein the slanted surfaces prevent the bush from coming out of bearing as the work piece is being introduced into the hole.

Other objects and advantages of the embodiments herein will become readily apparent from the following detailed description taken in conjunction with the accompanying drawings.

BRIEF DESCRIPTION OF THE DRAWINGS

FIGS. 5A through 5C, according to an embodiment of the present invention, are perspective, side and side sectional views of the work piece respectively.

DETAILED DESCRIPTION

Figure 1:
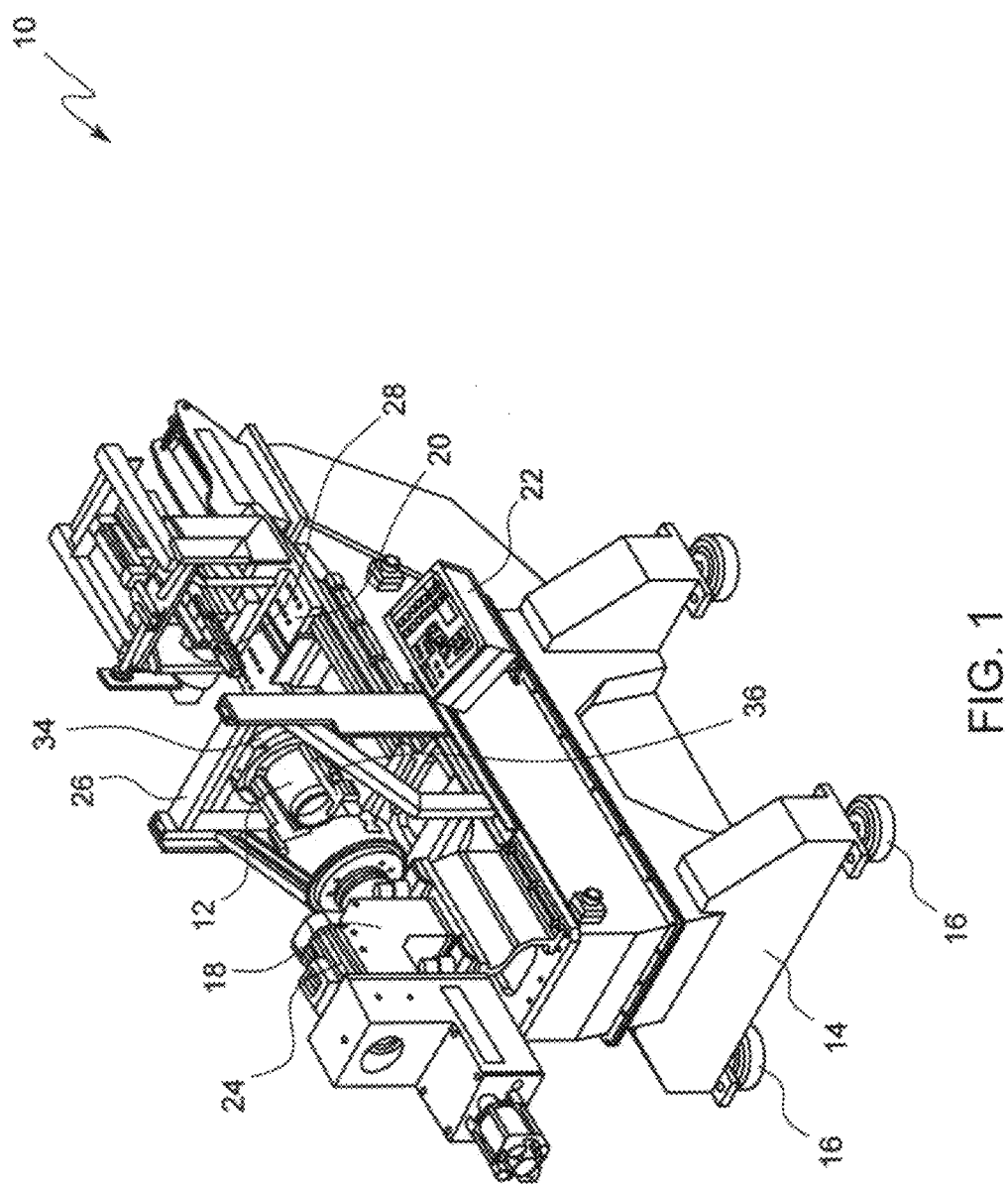
FIG. 1, according to an embodiment of the present invention, is atop perspective view of the multiple machining apparatus.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention relates to apparatuses that perform machining operations and more particularly to an apparatus that performs multiple machining operations by requiring no manual intervention between two consecutive machining operations, and even more particularly to such an apparatus that efficiently performs machining on relatively softer work pieces, such as those made of polyethylene.

One aspect of the present disclosure is directed to an apparatus capable of performing multiple machining operations on a plastic cylindrical work piece. The apparatus comprises a rotary fixture, which in turn comprises (i) a proximal means comprising a circular needle and a circular bush, wherein the proximal means snugly holds a proximal portion of the work piece; and (ii) a distal means comprising a plurality of jaws capable of radial angular displacement, wherein said distal means holds substantially the rest of the portion of the work piece. The apparatus further comprises a movable table comprising a blade holder for holding a plurality of blades, each of which corresponding to a machining operation and the movable table, and such that the blade holder is capable of movement along x, y and z axes. Upon receiving a plastic cylindrical work piece, the apparatus can perform multiple machining operations on the work piece by virtue of the rotation of the rotary fixture, rotation of the blades, and the movement of the movable table, working against the rotating work piece. The apparatus may be configured such that no manual input is required between two consecutive machining operations.

The rotary fixture can be powered by a motor. The rotary fixture may be rotatable in both clock and counter-clockwise directions. The circular bush may comprise a through hole for snugly and firmly receiving the work piece, with the bush holding the proximal portion and wherein the bush is held by the bearing and is made out of a resilient material. The circumferential surface of the hole may be resilient. The bush may be made of Teflon. The outer circumferential surface of the bush in the direction from the blade holder to the rotary fixture may be downwardly slanted, and the inner circumferential surface of the bearing in the direction from the blade holder to the rotary fixture may be correspondingly downwardly slanted. The slanted surfaces can prevent the bush from coming out of the bearing as the work piece is being introduced into the hole. The plurality of jaws of the distal means can hold the work piece, upon being received within the bush.

Figure 2:
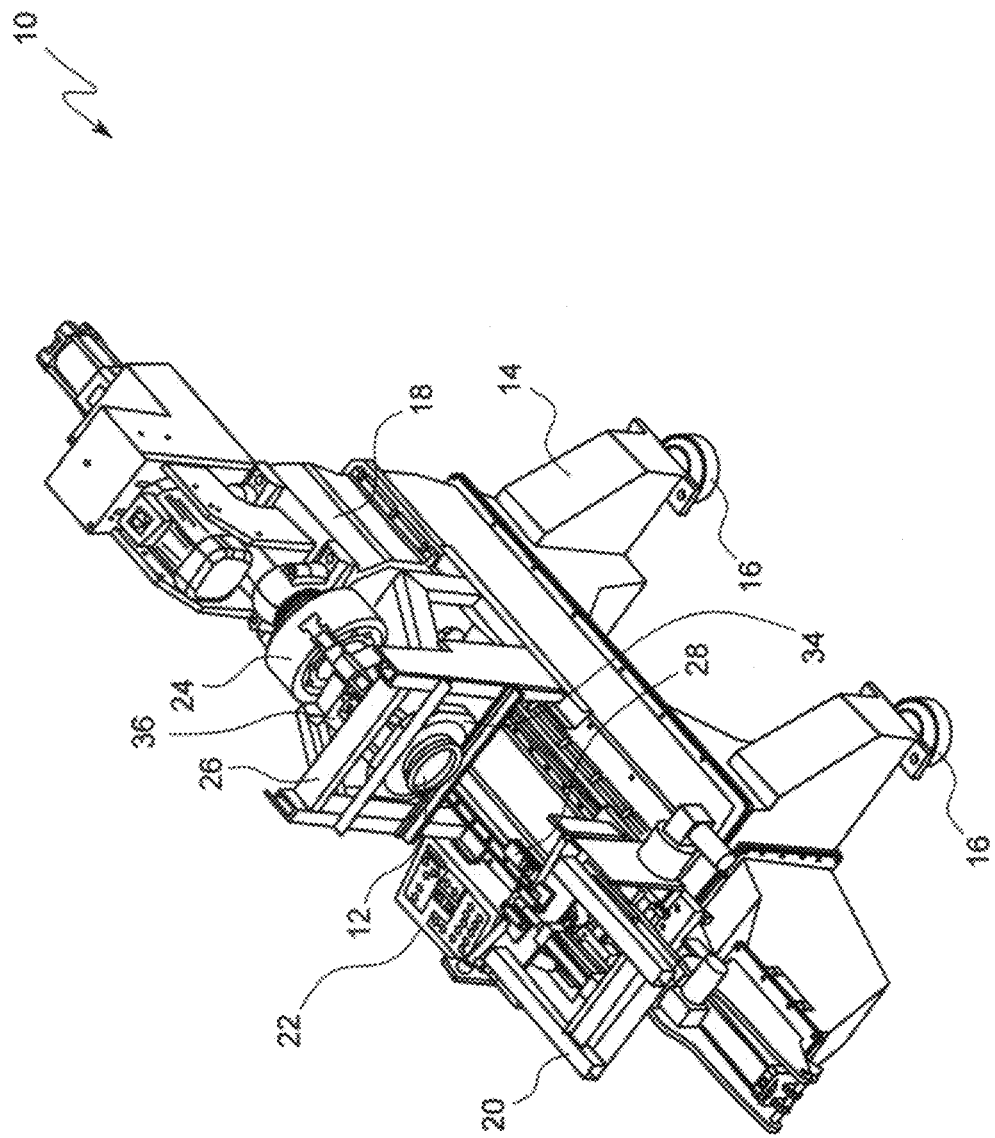
FIG. 2, according to an embodiment of the present invention, is another top perspective view of the multiple machining apparatus.
Figure 3:
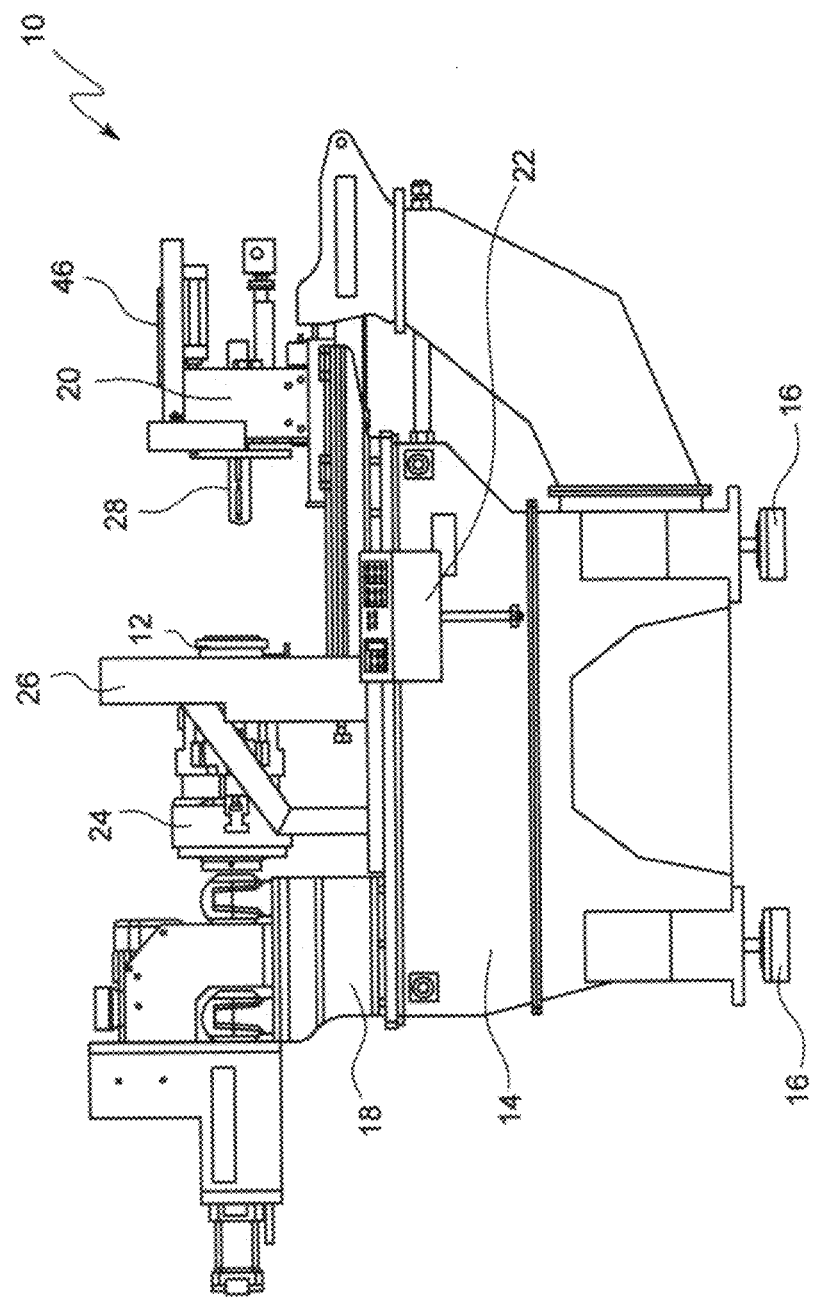
FIG. 3, according to an embodiment of the present invention, is a side view of the multiple machining apparatus.

Referring to FIGS. 1 through 3, the present invention comprises a multiple machining apparatus 10 intended for volume production for performing multiple machining operations either simultaneously or one after another on relatively softer, cylindrical injection-molded plastic work pieces 12 resulting in outputting cylindrical tubes, sleeves, waste water joints, such as, mouffe couplings, used for sewage, irrigation purposes, wastewater systems, and the like. The machining operations include turning, line boring, internal knurling, and end cutting. Notably, the machining operations are performed on a work piece 12 such that, no manual intervention, such as resetting, is required to be carried out by an operator between two consecutive machining operations. This eliminates the necessity of having a skilled operator carrying out the apparatus' operations.

The apparatus 10 is further designed to nullify the vibrations of the work pieces 12 as they are being subjected to the machining operations thereby yielding an output that is clean, neat and devoid of any trace marks. Upon the completion of the machining operations, in order to perform the final end cut on the work piece 12, the apparatus 10 is configured to measure the length of the machined product from the extremity thereof (factoring in the shrinkage or the stretch of the work piece 12) before proceeding to perform the aforementioned end cut.

Figure 4A:
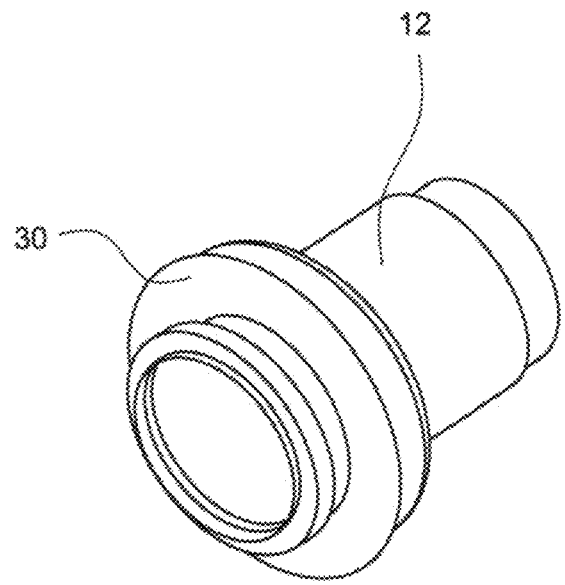
FIGS. 4A through 4D, according to an embodiment of the present invention, are perspective views of various samples of work pieces received into the respective bearing bushes.
Figure 4B:
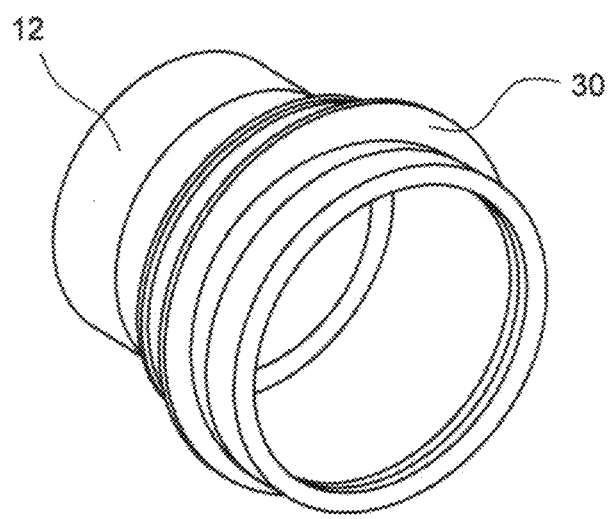
Figure 4C:
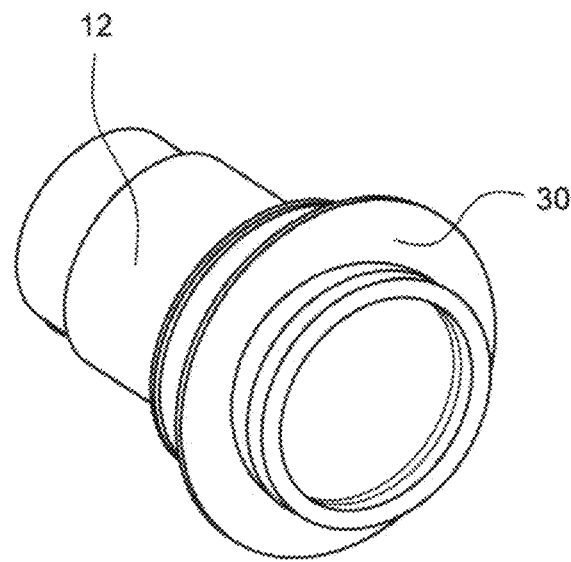
Figure 4D:
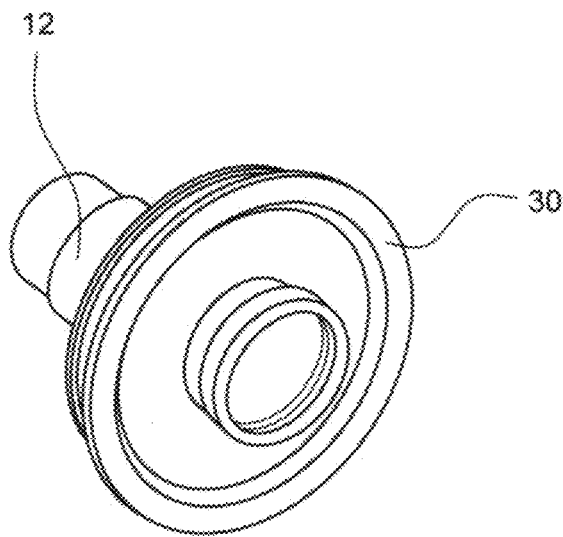
Figure 6:
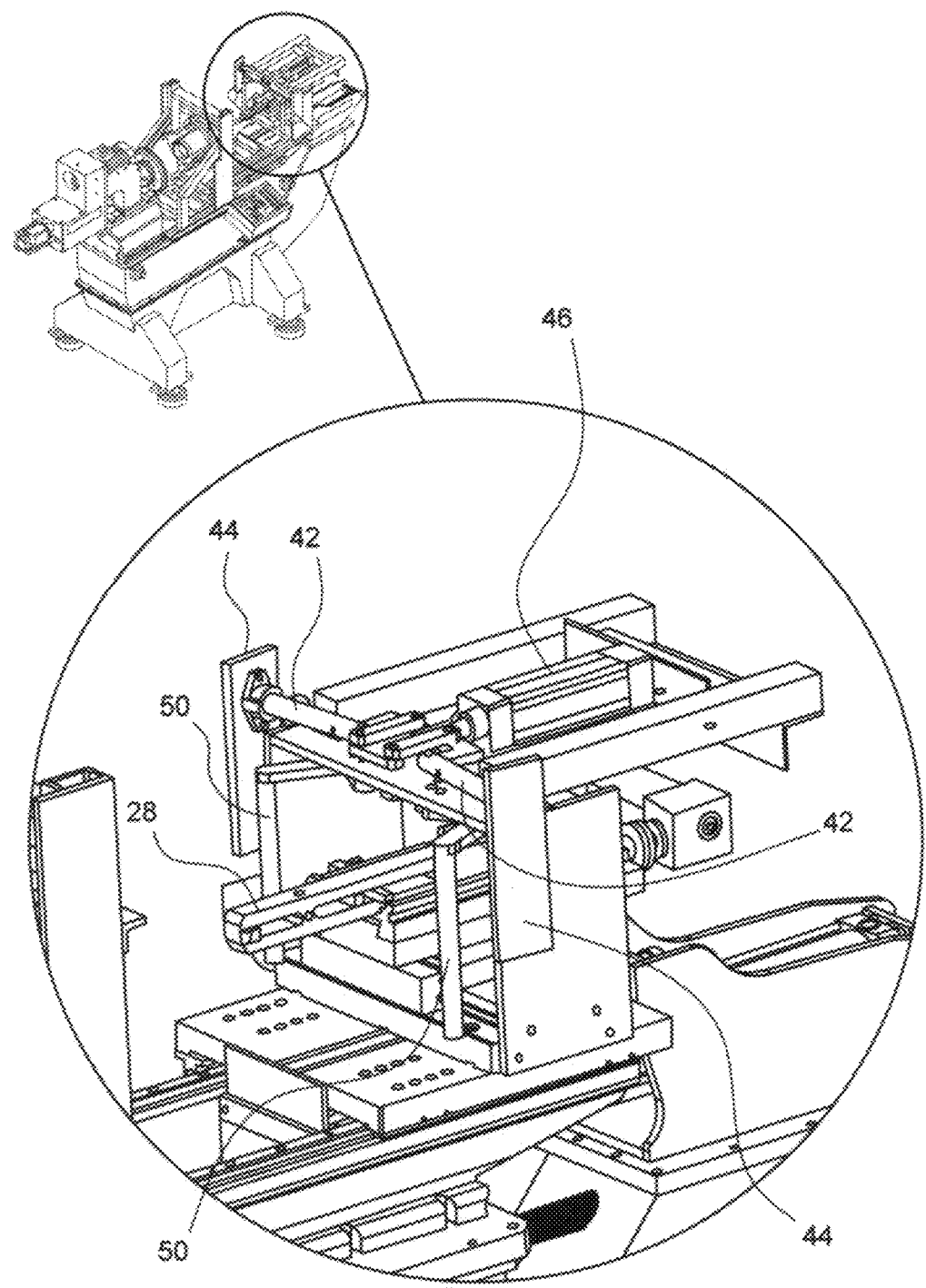
FIG. 6, according to an embodiment of the present invention, is a closer view of the top perspective view of the movable table.
Figure 7:
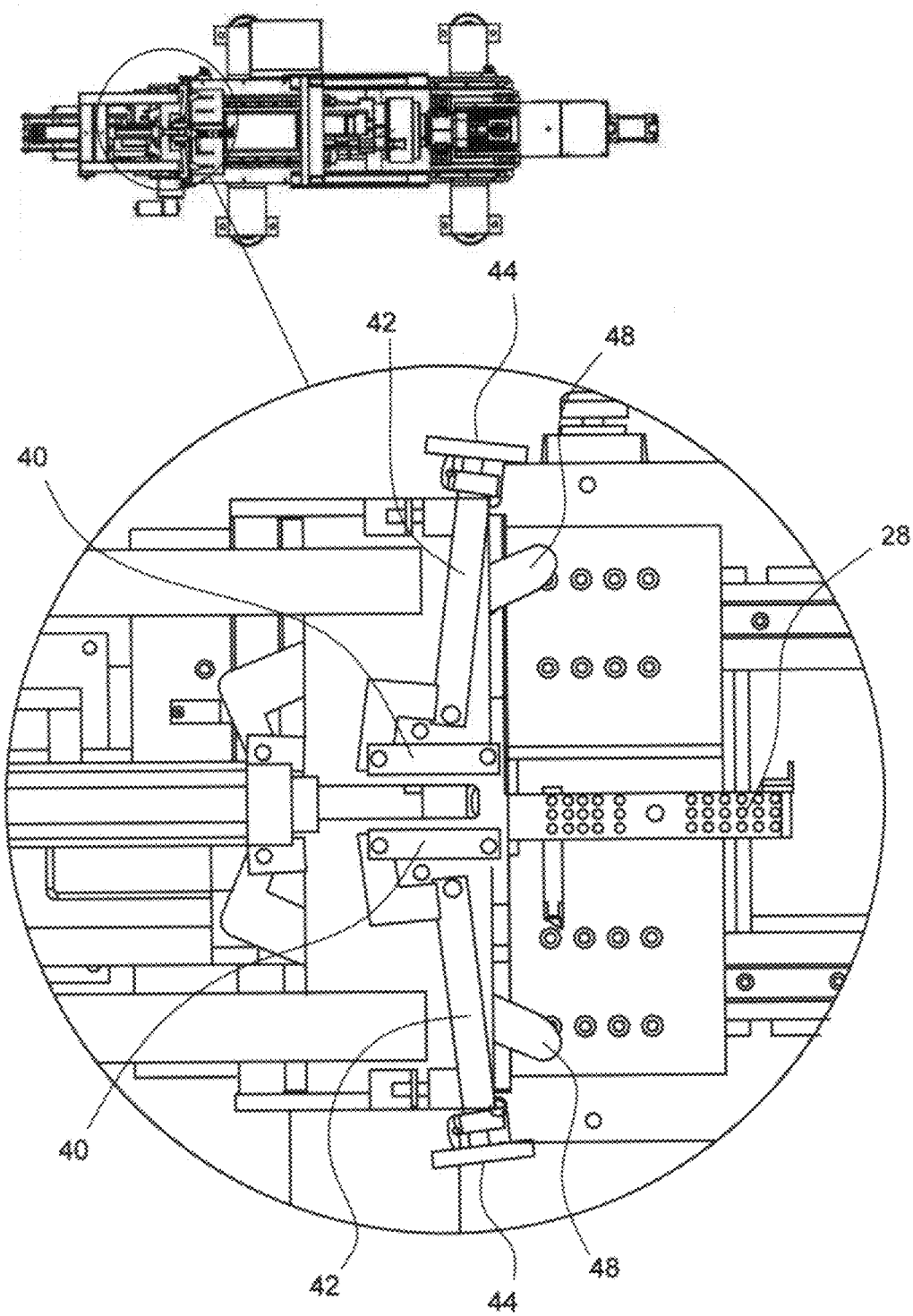
FIG. 7, according to an embodiment of the present invention, is a closer view of the top view of the movable table.
Figure 8:
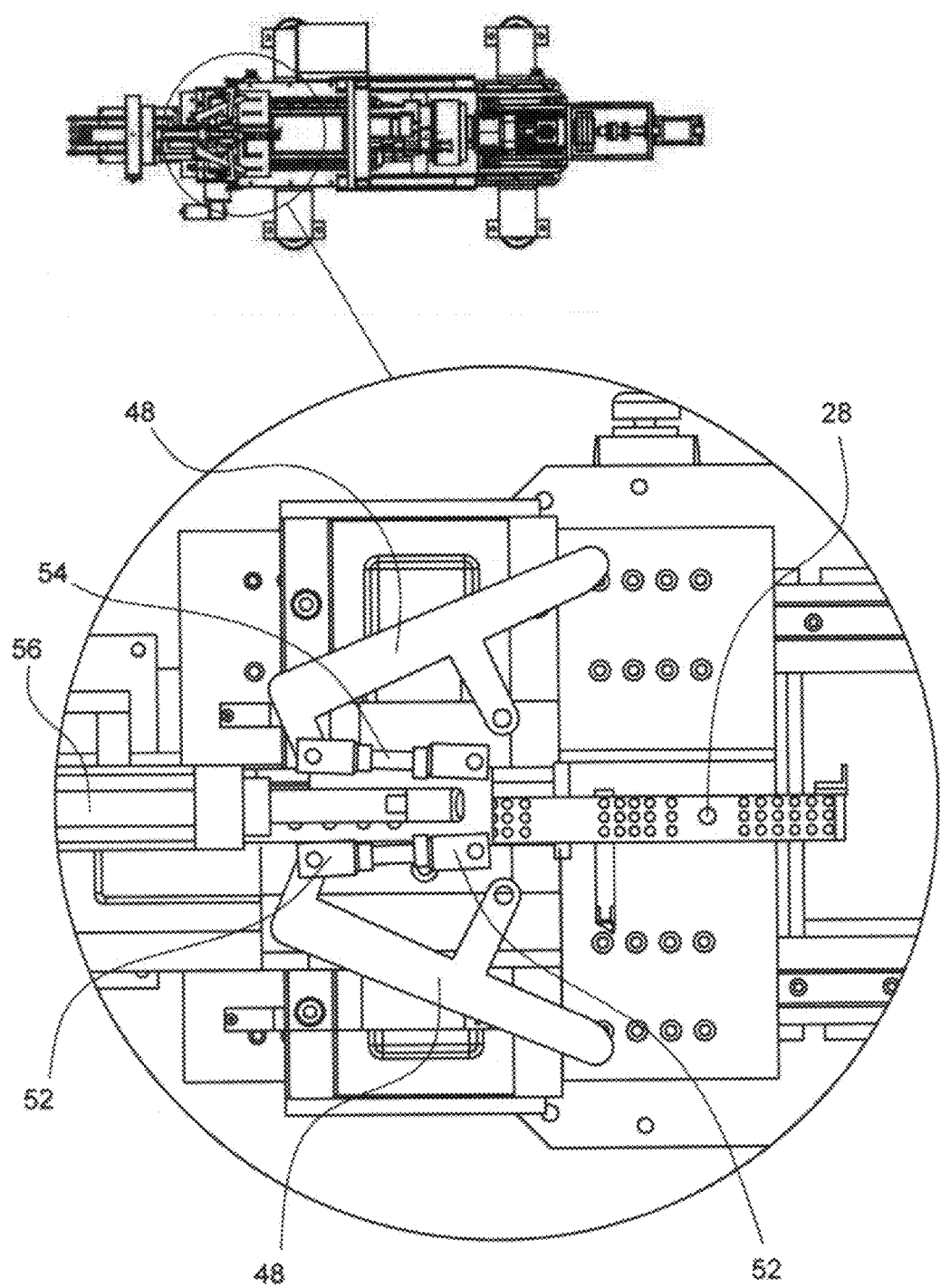
FIG. 8, according to an embodiment of the present invention, is a closer view of the top sectional view of the movable table.
Figure 9:
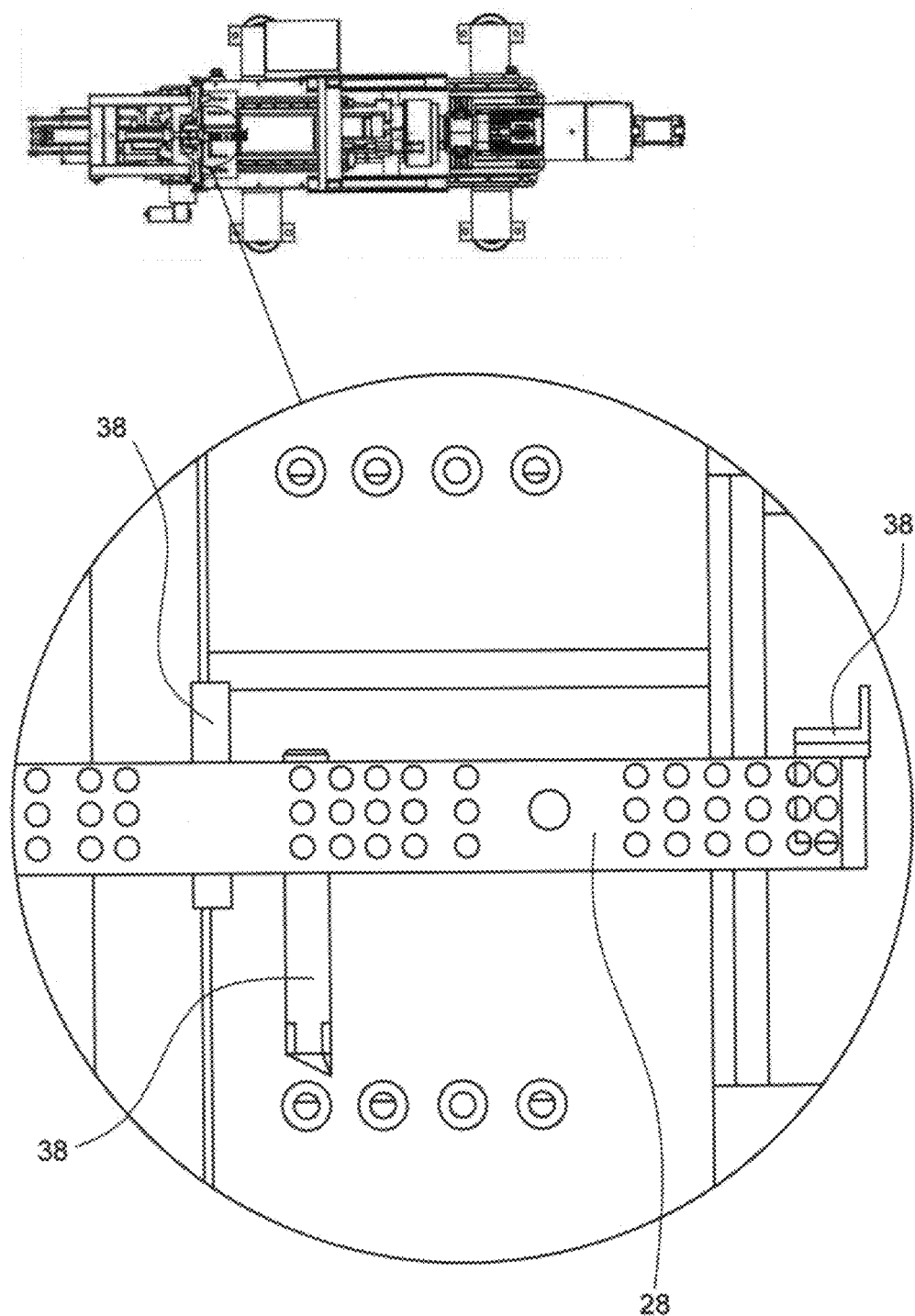
FIG. 9, according to an embodiment of the present invention, is a closer view of the top view of the blade holder.
Figure 10A:
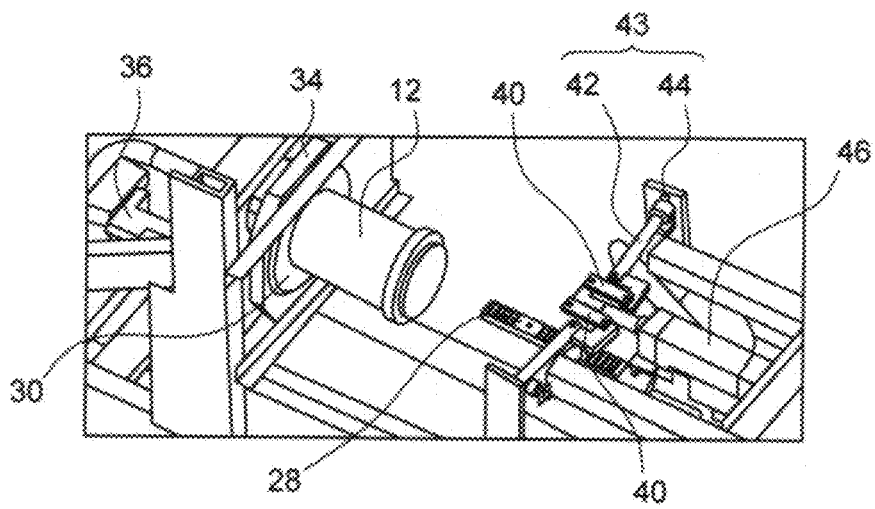
FIGS. 10A through 10F, according to an embodiment of the present invention, are sequential illustrations of the work piece being inserted into the bearing bush.
Figure 10B:
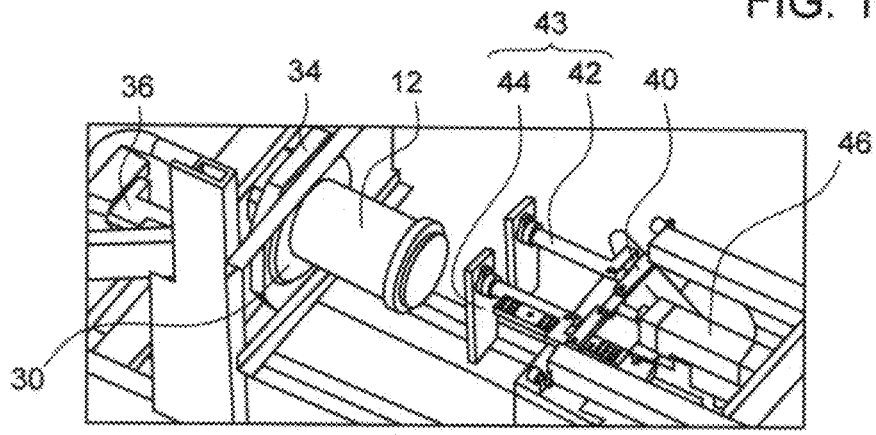
Figure 10C:
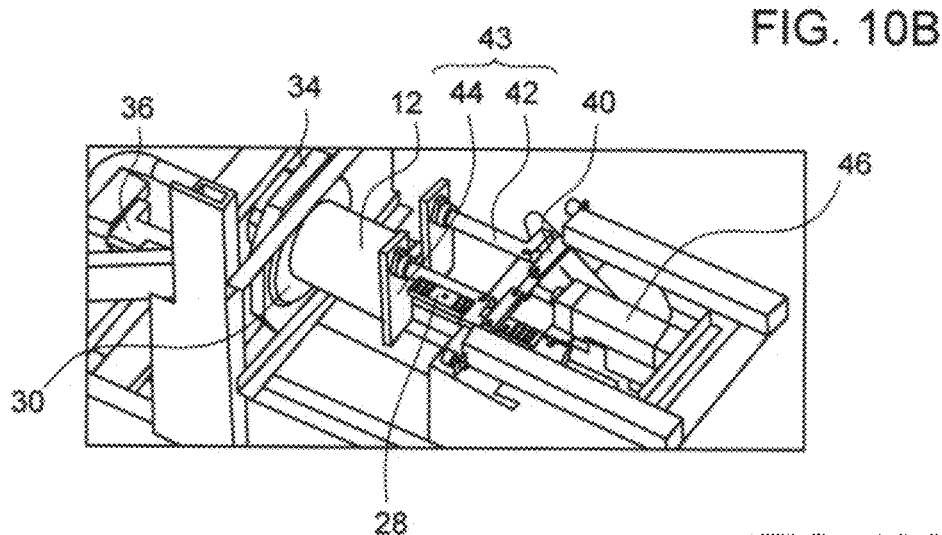
Figure 10D:
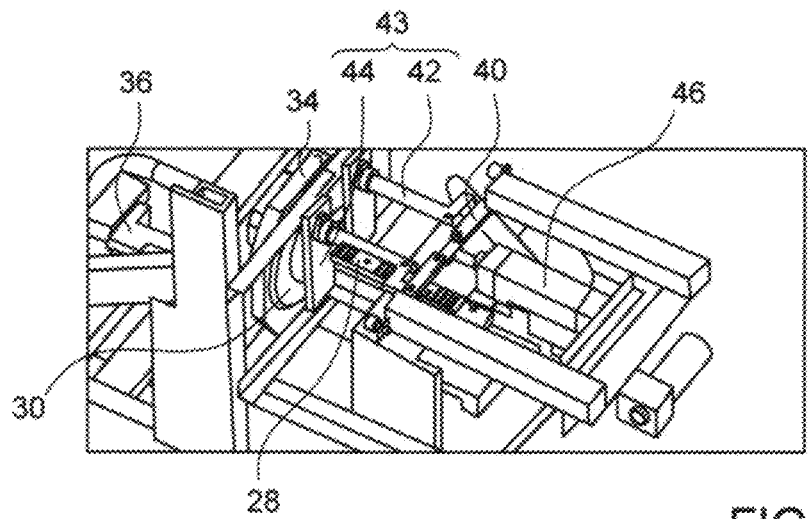
Figure 10E:
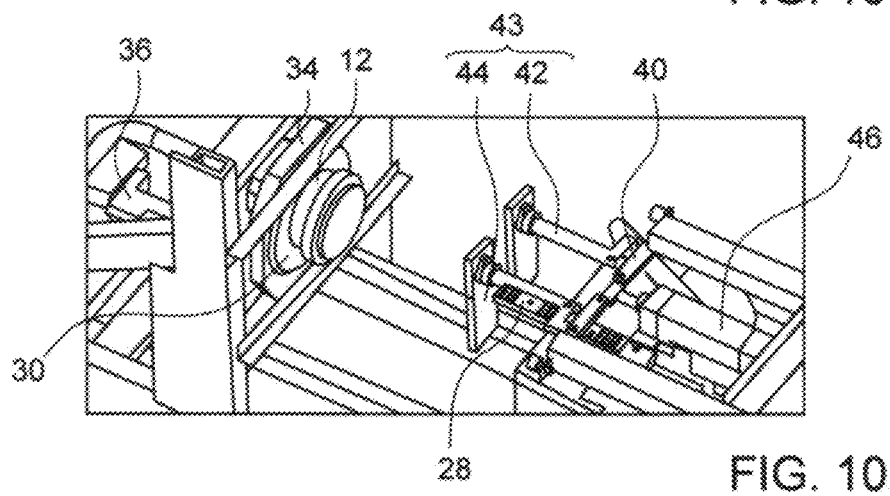
Figure 10F:
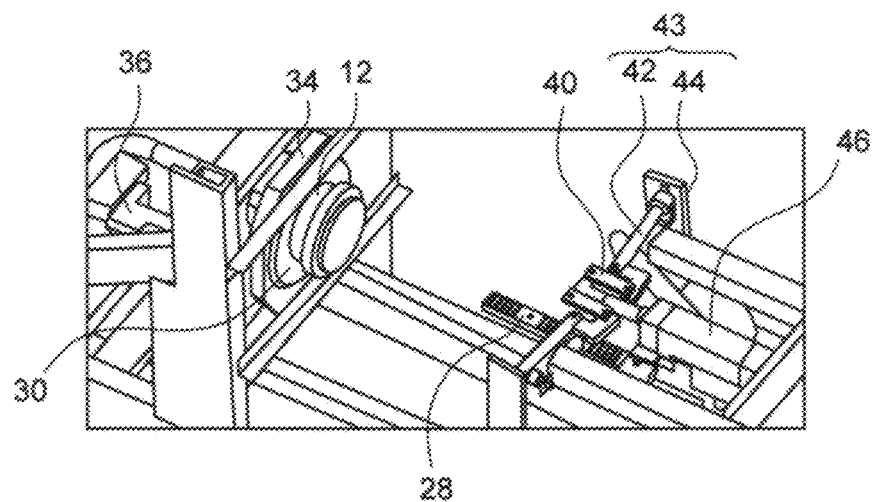
Figure 11A:
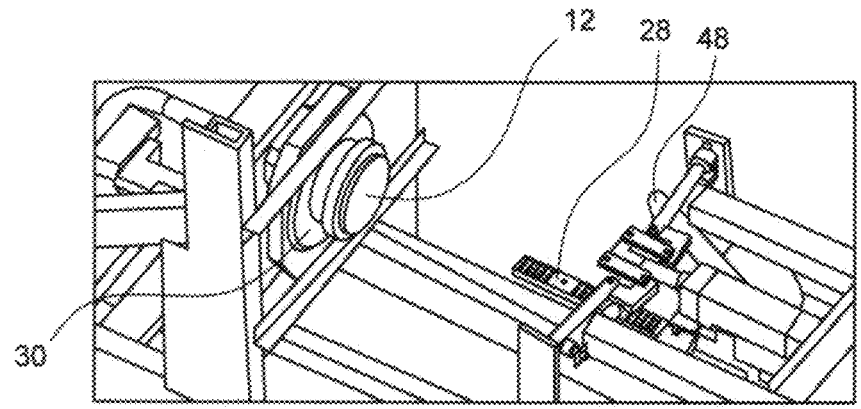
FIGS. 11A through 11F, according to an embodiment of the present invention, are sequential illustrations of the work piece being ejected from the bearing bush.
Figure 11B:
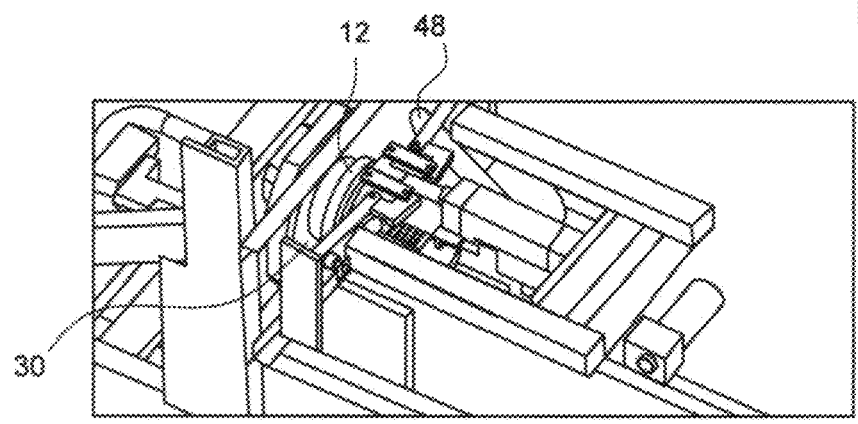
Figure 11C:
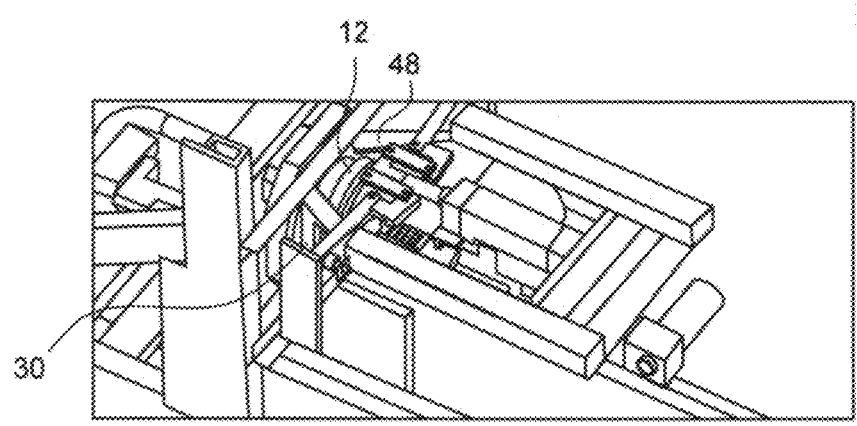
Figure 11D:
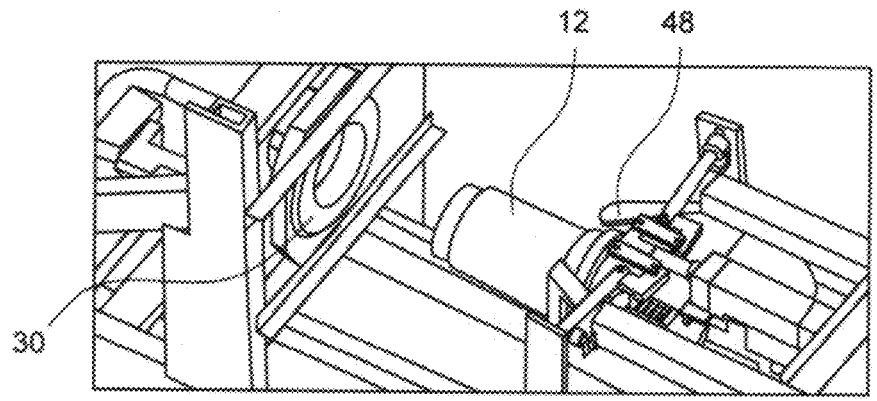
Figure 11E:
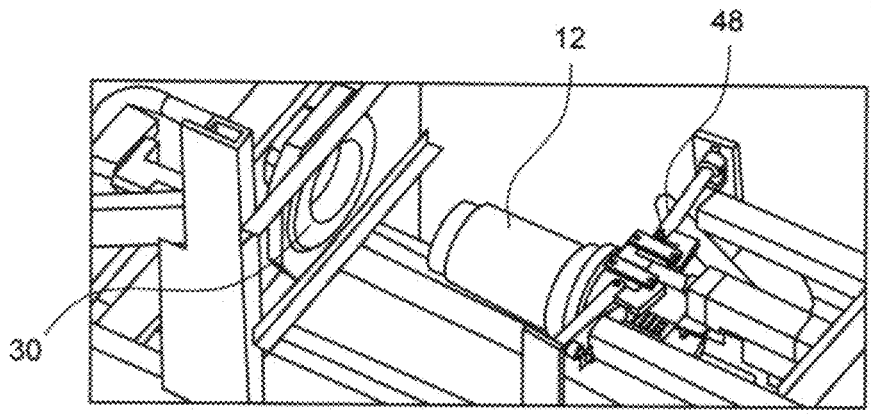
Figure 11F:
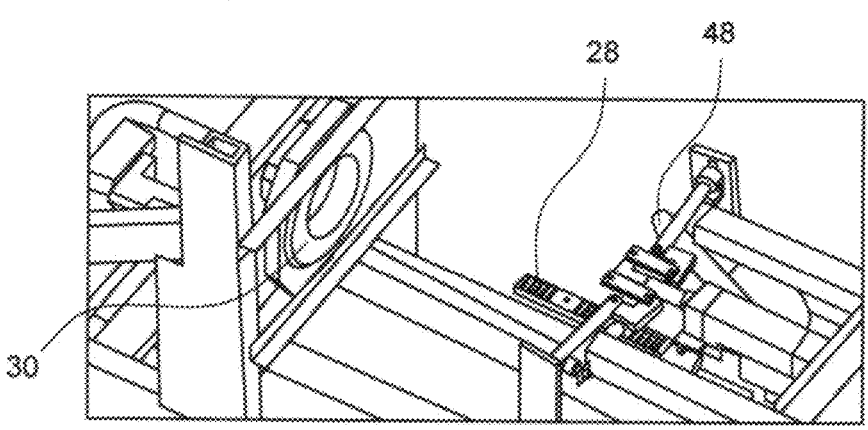

Referring to FIGS. 1 through 3, 4A, and 5A through 5C, the work piece 12, which may be of uniform or non-uniform cross-section, is particularly made of polyethylene. The work piece 12 is longitudinally defined between a proximal and a distal extremity, wherein the proximal extremity terminates in a circumferential flange 32, the utility of which will become apparent from the following body of text. Notably, the apparatus 10 is designed to conform to work pieces 12 of various diameters, lengths and materials. The samples of differently-shaped work pieces 12 capable of being machined by the apparatus 10 are shown in FIGS. 4B through 4D.

Referring to FIGS. 1 through 4, the apparatus 10 comprises an apparatus body 14 supported on the ground by a plurality of legs 16. For ease of understanding, longitudinally, the apparatus 10 is divided into a stationary table 18, a movable table 20 facing the stationary table 18 and a control panel 22 for enabling an operator to perform the operations of the apparatus 10.

The stationary table 18 comprises a rotary fixture for snugly and firmly receiving the work piece 12 therewithin. The rotary fixture comprises a circular needle bearing 34 within which, a circular bush 30 resides wherein, the work piece 12 is adapted to be snugly received within the thorough bush hole. More particularly, the work piece 12 is received within the bush 30 such that, the bush 30 holds the work piece 12 at a proximal portion thereof closer to the flange 32 as seen in the referred drawings. Notably, the bush 30 is made of soft Teflon material so that a snug, tight, and vibration-free fit is achieved between the work piece 12 and the bush 30. In one embodiment, the contours of the inner and outer circumferences of the needle bearing 34 and the bush 30 are matchingly slanted so as to prevent the bush 30 from going out of the bearing 34 as the work piece 12 is inserted thereinto.

The rotary fixture further comprises three radially-movable jaws 36 for holding the rest of the portion of the work piece 12. More particularly, the jaws 36 are configured to be movable between a lock and an unlock position wherein, in the lock position, the jaws 36 snugly abut the outer surface of the work piece 12 and wherein, in the unlock position, the work piece 12 is free of the jaws 36. The jaws 36 are operatively coupled to a rotary motor 24 for rotating the jaws 36 and thereby the work piece 12 engaged therewith can be rotated in both clock and anti-clockwise directions. Notably, the firm bracing of the work piece 12 by the bush 30 and the jaws 36 prevent the work piece 12 from shaking when being subjected to the machining operations.

Referring to FIGS. 1 through 3 and 6 through 9, the movable table 20 comprises a blade holder 28 for holding a plurality of blades 38 that work against the work piece 12 resulting in the subtractive manufacturing thereof. The blade holder 28 comprises a pair of elongate top and bottom rectangular bars, each of which are anchored and extend from the movable table 20. The free end of the top and bottom bars are closed, thereby rendering the blade holder 28 longitudinally closed, but laterally thoroughly open. Each of the top and bottom bars comprises a plurality of aligned, through vertical holes, which enable for more than one blade 38 to be anchored therebetween (as can be seen more clearly in FIG. 9) for simultaneously performing machining operations on the work piece 12. Notably, the movable table 20 is configured to be movable along X, Y and Z axes. The movement of the movable table 20, as enabled by one or more driving means, is controlled from the control panel 22 by the operator.

The movable table may further comprise an insertion assembly disposed over the blade holder for pushing the work piece into the bush hole. The insertion assembly may comprise (a) an insertion hub; (b) a pair of insertion members; and (c) an insertion jacket. Each of the insertion members may comprise (i) an elongate insertion rod hingedly coupled to the insertion hub, the insertion rod adapted to be angularly movable between an active position, where the insertion rod is perpendicular to the length of the apparatus, and an inactive position, where the insertion rod is parallel to the length of the apparatus; and (ii) an insertion plate disposed at the free end of the insertion rod, such that the outer surface of the insertion plate is vertically disposed. The insertion assembly may further comprise the insertion jack for powering the insertion hub. Upon the activation of the insertion jack, the insertion rods may move from the inactive position to an active position. Upon the activation of the insertion assembly and the movable table, the movable table can move horizontally until the insertion plates push the work piece into the bush hole until the bush hole holds the proximal portion of the work piece. One proximal extremity of the work piece may terminate in a circumferential flange.

Referring to FIGS. 1 through 3 and 6 through 8, the apparatus 10 further comprises a means for mechanically inserting the work piece 12 into the bush 30 prior to the commencement of the machining operations thereon and, upon the completion of the machining operations, mechanically ejecting or pulling out the work piece 12 from the bush 30. The means for inserting, which is a part of the movable table 20, comprises an insertion assembly comprising an insertion jack 46, an insertion hub 40, and a pair of insertion members 43.

The insertion jack 46 comprises a linear actuator comprising an elongate actuator extending from a piston-cylinder housing wherein, the actuator rod is linearly longitudinally movable between a default proximal position and a distal position. Notably, at the proximal position, the free end of the actuator rod is furthest from the piston-cylinder housing and, at the distal position, the free end of the actuator rod is closest to the piston-cylinder housing. The free end of the actuator rod terminates in a T-shaped member (hereinafter referred to as the "T-member") comprising an elongate piece bifurcating another shorter elongate piece.

Referring to FIGS. 1 through 3 and 6 through 10, the insertion hub 40 comprises a pair of parallel spaced-apart elongate hub pieces. While the proximal free ends of each hub piece is hingedly coupled to the free ends of the shorter elongate piece (of the T-member), the distal free ends of each hub piece is hingedly coupled to the movable platform 20 itself wherein, as the insertion jack 46 is actuated and the actuator rod moves from the proximal position to the distal position, the laterally-facing hub pieces rotate to be longitudinally aligned and wherein, as the actuator rod moves from the distal position to the proximal position, the laterally-facing hub pieces rotate from the longitudinally-aligned position to the original position, where they laterally face one another.

Referring to FIGS. 1 through 3 and 6 through 10, each insertion member comprises an elongate insertion rod 42 extending from a distal end of a hub piece and a rectangular insertion plate 44 perpendicularly attached to the free end of the insertion rod 42. More particularly, the insertion rod 42 is coupled to the hub piece such that, as the actuator rod is at the distal position causing the hub pieces to be longitudinally aligned with one another, the insertion rod 42 is at an active position, where the insertion rod 42 is parallel to the length of the apparatus 10. On the other hand, as the actuator rod is at the proximal position causing the hub pieces to be parallel with one another, the insertion rod 42 is at an inactive position, where the insertion rod 42 is perpendicular to the length of the apparatus 10.

Referring to FIGS. 10A through 10F, in order to insert the work piece 12 into the bush 30, the insertion jack 46 is actuated causing the actuator rod to move into the distal position pulling the hub pieces causing them to be longitudinally aligned. At this point, as mentioned earlier, the insertion rods 42 are parallel to one another and to the length of the apparatus 10. Also at this point, the outer surfaces of the insertion plates 44 face the cross-section of the work piece 12. At this point, as the movable table 20 is moved towards the stationary table 18, the insertion plates 44 come into contact with the circular edge of the work piece 12 thereafter pushing the work piece 12 into the bush 30 till the bush 30 holds the proximal portion of the work piece 12. Once this is accomplished, the movable table 20 move backwards and the insertion members 43 are moved back to the inactive position.

The movable table may further comprise an ejection assembly disposed over the blade holder. The ejection assembly may comprise (a) an ejection hub; (b) a pair of ejection members; and (c) an ejection jack. Each of the ejection members may comprise (i) a vertical rod; and (ii) a pair of top and bottom support rods for supporting the vertical rod between the distal extremities thereof, the proximal extremity of the top support rod is hingedly coupled to the ejection hub while the proximal extremity of the bottom support rod is also hingedly coupled for allowing free angular movement as driven by the angular movement of the top support rod.

The pair of top and bottom support rods may be adapted to be angularly movable between an active position, where the vertical rod is closer to the longitudinal axis of the apparatus, and an inactive position, where the vertical rod is further from the longitudinal axis of the apparatus. The ejection jack may be for powering the ejection hub, such that upon the activation of the ejection jack, the vertical rods move closer to one another. Upon the activation of the ejection assembly and the movable table, the movable table may move horizontally until a predetermined position at which point, the vertical rods move into the active position whereby, the vertical rods hold the work piece. At this point, the work piece is pulled out of the bush hole upon the completion of the machining operations.

Referring to FIGS. 1 through 3 and 6 through 10, the means for ejecting, which is a part of the movable table 20, comprises an ejection assembly comprising an ejection hub, an ejection jack 56, and a pair of ejection members. The ejection jack 56, similar to the insertion jack 46, comprises a linear actuator comprising an elongate actuator extending from a piston-cylinder housing wherein, the actuator rod is linearly longitudinally movable between a default proximal position and a distal position. Notably, at the proximal position, the free end of the actuator rod is furthest from the piston-cylinder housing and, at the distal position, the free end of the actuator rod is closest to the piston-cylinder housing. The free end of the actuator rod terminates in a T-shaped member (hereinafter referred to as the "T-member") comprising an elongate piece bifurcating another shorter elongate piece.

Referring to FIGS. 1 through 3 and 6 through 8, the ejection hub, similar to the insertion hub 40, comprises a pair of parallel, spaced-apart elongate hub pieces. Each hub piece comprises spaced-apart proximal and distal pieces 52 connected by a mid piece 54. While the proximal pieces 52 of each hub piece is hingedly coupled to the free ends of the shorter elongate piece (of the T-member), the distal piece 52 of the each hub piece is hingedly coupled to the movable platform 20 itself wherein, as the ejection jack 56 is actuated and as the actuator rod moves from the proximal position to the distal position, the laterally-facing hub pieces rotate to be longitudinally aligned and wherein, as the actuator rod moves from the distal position to the proximal position, the laterally-facing hub pieces rotate from the longitudinally-aligned position to the original position, where they laterally face one another.

Referring to FIGS. 1 through 3 and 6 through 11, each ejection member comprises a vertical rod 50 held between the free ends of top 48 and bottom support rods that are parallel to one another. The other end (the one that is not in contact with the vertical rod 50) of each top support rod 48 is hingedly coupled to distal extremity of the hub piece such that, as the actuator rod is at the distal position causing the hub pieces to rotate. The top support rod 48 too rotates causing the vertical rod 50 to move towards the longitudinal center of the apparatus 10. On the other hand, as the actuator rod moves to the proximal position, the vertical rod 50 moves away from the longitudinal center of the apparatus 10. In other words, as the actuator rod is at the default proximal position, the vertical rods 50 are away from longitudinal center of the apparatus 10 and wherein, as the actuator rod moves to the distal position, the vertical rods 50 come closer towards one another.

Referring to FIGS. 11A through 11F, in order to pull the work piece 12 from the bush 30, initially, the movable table 20 is moved closer to the stationary table 18 whereafter, the ejection jack 56 is actuated causing the actuator rod to move into the distal position bringing the vertical rods 50 towards one another. At his point, the vertical rods 50 abut the outer surface of the work piece 12. Once there, the movable table 20 moves backwards causing the vertical rods 50, as supported by the flange 32 of the work piece 12, to pull the work piece 12 from the bush 30.

One aspect of the present disclosure is directed to a machining apparatus capable of performing multiple machining operations on a plastic cylindrical work piece without the need for manual input between two consecutive machining operations. The apparatus may comprise (a) a rotary fixture capable of rotation; and (b) a movable table comprising a blade holder which holds a plurality of blades, wherein the blade holder is capable of movement along x, y and z axes. The rotary fixture may comprise (i) a proximal means for snugly holding a proximal portion of the work piece. The proximal means may comprise (1) a circular needle bearing; and (2) a circular bush comprising a through hole for snugly and firmly receiving the work piece therethrough, with the bush holding the proximal portion and wherein the bush is held by the bearing and is made out of a resilient material, and further wherein the circumferential surface of the hole is resilient.

The rotary fixture may further comprise (ii) a distal means comprising a plurality of jaws capable of radial displacement, wherein the jaws hold the work piece once the work piece is received within the bush. The movable table of the apparatus may comprise a blade holder which holds a plurality of blades, wherein the blade holder is capable of movement along x, y and z axes. The work piece may be a cylindrical polyethylene work piece and upon receiving said polyethylene cylindrical work piece, the apparatus can perform multiple machining operations on the work piece by virtue of the rotation of the rotary fixture, rotation of the blades, and the movement of the movable table, working against the rotating work piece. In this configuration, the apparatus may require no manual input between two consecutive machining operations.

The outer circumferential surface of the bush in the direction from the blade holder to the rotary fixture can be downwardly slanted. The inner circumferential surface of the bearing in the direction from the blade holder to the rotary fixture may correspondingly be downwardly slanted. The slanted surfaces can prevent the bush from coming out of the bearing as the work piece is being introduced into the hole. The multiple machining operations comprises turning, line boring, end cutting, internal grooving, and knurling of the inner surfaces of the work piece.

The multiple machining operations may comprise turning, line boring, end cutting, internal grooving, and knurling of the inner surfaces of the work piece. For the end cutting purposes, the point at which the work piece is to be cut may be determined by measuring the distance from the proximal extremity of the work piece. The work piece may comprise a wastewater joint, which includes a mouffe coupling. The work piece may comprise polyethylene.

One aspect of the present disclosure is directed to a machining apparatus for performing multiple back-to-back machining operations on a polyethylene cylindrical work piece. The apparatus may comprise (a) a rotary fixture capable of rotation; and a movable table capable of movement along x, y and z axes. The rotary fixture may comprise (i) a proximal means for snugly holding a proximal portion of the work piece, and (ii) a distal means comprising a plurality of jaws capable of radial displacement. The proximal means itself may comprise (1) a circular needle bearing; and (2) a circular bush comprising a through hole for snugly and firmly receiving the work piece therethrough, with the bush holding the proximal portion and wherein the bush is held by the bearing and is made out of a resilient material, and further wherein the circumferential surface of the hole is resilient. The distal means may comprise a plurality of jaws capable of radial displacement, wherein the jaws hold the work piece. The movable table of the apparatus may be capable of movement along x, y and z axes. It may comprise (i) a blade holder for holding a plurality of blades, each of which is configured to a machining operation; and (ii) an insertion assembly disposed over the blade holder for pushing the work piece into the bush hole.

This insertion assembly itself may comprise (1) an insertion hub; (2) a pair of insertion members; and (3) an insertion jack. Each of these insertion members may comprise (a) an elongate insertion rod hingedly coupled to the insertion hub, the insertion rod adapted to be angularly movable between an active position, where the insertion rod is perpendicular to the length of the apparatus, and an inactive position, where the insertion rod is parallel to the length of the apparatus; and (b) an insertion plate disposed at the free end of the insertion rod such that, the outer surface of the insertion plate is vertically disposed. The insertion jack of the apparatus is for powering the insertion hub, such that upon the activation of the insertion jack, the insertion rods move from the inactive position to an active position. Upon the activation of the insertion assembly and the movable table, the movable table may move horizontally till the insertion plates push the work piece into the bush hole until the bush hole holds the proximal portion of the work piece.

The machining apparatus may further comprise (iii) an ejection assembly disposed over the blade holder, for pulling the work piece out of the bush hole upon the completion of the machining operations. The ejection assembly may comprise (1) an ejection hub; (2) a pair of ejection members; and an ejection jack. Each of the ejection members may comprise: (a) a vertical rod; and (b) a pair of top and bottom support rods for supporting the vertical rod between the distal extremities thereof, the proximal extremity of the top support rod is hingedly coupled to the ejection hub while the proximal extremity of the bottom support rod is also hingedly coupled for allowing free angular movement as driven by the angular movement of the top support rod, the pair of top and bottom support rods adapted to be angularly movable between an active position, where the vertical rod is closer to the longitudinal axis of the apparatus, and an inactive position, where the vertical rod is further from the longitudinal axis of the apparatus.

The ejection jack may be for powering the ejection hub, such that upon the activation of the ejection assembly and the movable table, the movable table moves horizontally until a predetermined position at which point, the vertical rods move into the active position whereby, the vertical rods hold the work piece. The work piece is then pulled out of the bush hole upon the completion of the machining operations. The multiple machining operations may be executed consecutively and without manual input and as the work piece, by virtue of the rotation of the rotary fixture, is rotated and with the blades, by virtue of the movement of the movable table, working against the rotating work piece.

The outer circumferential surface of the bush in the direction from the blade holder to the rotary fixture may be downwardly slanted, and the inner circumferential surface of the bearing in the direction from the blade holder to the rotary fixture may be correspondingly downwardly slanted. The slanted surfaces can prevent the bush from coming out of bearing as the work piece is being introduced into the hole. The multiple machining operations may comprise turning, line boring, end cutting, internal grooving, and knurling of the inner surfaces of the work piece.

One aspect of the present disclosure is directed to a method of performing multiple back-to-back machining operations on a polyethylene cylindrical work piece. The method comprises electronically pushing the work piece into a rotary fixture capable of rotation such that a proximal portion of the work piece is snuggly held therewithin. The rotary fixture comprises the proximal means comprising a circular needle bearing and a circular bush comprising a through hole for snugly and firmly receiving the work piece therethrough, with the bush holding the proximal portion and wherein the bush is held by the bearing and is made out of a resilient material, and further wherein the circumferential surface of the hole is resilient. The method of performing multiple back-to-back machining operations on a polyethylene cylindrical work piece further comprises disposing a movable table opposite to the rotary fixture, the movable table capable of movement along x, y and z axes, the movable table comprising a blade holder for holding a plurality of blades, each of which is configured for a machining operation. The method further comprises subjecting the work piece to rotation by the rotation of the rotary fixture; and subjecting a blade to movement by virtue of the movement of the movable table such that, the blade works against the rotation of the work piece resulting in the work piece being subjected to one or more machining operations resulting in subtractive manufacturing. As a final step of the method, the finished work piece is pulled out of the circular bush electronically via automation.

The one or more machining operations may comprise turning, line boring, end cutting, internal grooving, and knurling of the inner surfaces of the work piece. For the end cutting purposes, the point at which the work piece is to be cut may be determined by measuring the distance from the proximal extremity of the work piece. In one example, the outer circumferential surface of the bush in the direction from the blade holder to the rotary fixture is downwardly slanted and wherein, the inner circumferential surface of the bearing in the direction from the blade holder to the rotary fixture is correspondingly downwardly slanted; wherein the slanted surfaces prevent the bush from coming out of bearing as the work piece is being introduced into the hole.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. An apparatus capable of performing multiple machining operations on a plastic cylindrical work piece, the apparatus comprising:

(a) a rotary fixture capable of rotation, the rotary fixture comprising:
(i) a proximal means comprising a circular needle bearing and a circular bush, wherein the proximal means snugly holds a proximal portion of the work piece; and (ii) a distal means comprising a plurality of jaws capable of radial displacement, wherein said distal means holds substantially the rest of the portion of the work piece; and
(b) a movable table comprising a blade holder for holding a plurality of blades, each of which corresponding to a machining operation and the movable table, and wherein the blade holder is capable of movement along x, y and z axes;
wherein the movable table further comprises an insertion assembly disposed over the blade holder for pushing the work piece into the bush hole, the insertion assembly comprising:
(a) an insertion hub;
(b) a pair of insertion members, each of which comprising:
(i) an elongate insertion rod hingedly coupled to the insertion hub, the insertion rod adapted to be angularly movable between an active position, where the insertion rod is perpendicular to the length of the apparatus, and an inactive position, where the insertion rod is parallel to the length of the apparatus;
(ii) an insertion plate disposed at the free end of the insertion rod, such that the outer surface of the insertion plate is vertically disposed; and
(c) an insertion jack for actuating, via a linear actuator, the insertion hub, wherein upon the actuation of the insertion jack, the insertion rods move from the inactive position to an active position; wherein, upon the actuation of the insertion assembly and the movable table, the movable table moves horizontally until the insertion plates push the work piece into the bush hole until the bush hole holds the proximal portion of the work piece.

2. The apparatus of claim 1, wherein the rotary fixture is powered by a motor.

3. The apparatus of claim 1, wherein the rotary fixture is rotatable in both clock and counter-clock-wise directions.

4. The apparatus of claim 1, wherein the circular bush comprises a through hole for snugly and firmly receiving the work piece therethrough, with the bush holding the proximal portion and wherein the bush is held by the circular needle bearing and is made out of a resilient material, and further wherein the circumferential surface of the hole is resilient.

5. The apparatus of claim 1, wherein the circular bush is made of Teflon.

6. The apparatus of claim 1, wherein the plurality of jaws of the distal means holds the work piece, upon being received within the bush.

7. The apparatus of claim 1, wherein one proximal extremity of the work piece terminates in a circumferential flange.

8. The apparatus of claim 1, wherein the work piece comprises polyethylene.

9. An apparatus capable of performing multiple machining operations on a plastic cylindrical work piece, the apparatus comprising:
(a) a rotary fixture capable of rotation, the rotary fixture comprising:
(i) a proximal means comprising a circular needle bearing and a circular bush, wherein the proximal means snugly holds a proximal portion of the work piece; and (ii) a distal means comprising a plurality of jaws capable of radial displacement, wherein said distal means holds substantially the rest of the portion of the work piece; and
(b) a movable table comprising a blade holder for holding a plurality of blades, each of which corresponding to a machining operation and the movable table, and wherein the blade holder is capable of movement along x, y and z axes;
wherein the movable table further comprises an ejection assembly disposed over the blade holder, the ejection assembly comprising:
(a) an ejection hub;
(b) a pair of ejection members, each of which comprising:
(i) a vertical rod; and
(ii) a pair of top and bottom support rods for supporting the vertical rod between the distal extremities thereof, the proximal extremity of the top support rod is hingedly coupled to the ejection hub while the proximal extremity of the bottom support rod is also hingedly coupled for allowing free angular movement as driven by the angular movement of the top support rod, and the pair of top and bottom support rods adapted to be angularly movable between an active position, where the vertical rod is closer to the longitudinal axis of the apparatus, and an inactive position, where the vertical rod is further from the longitudinal axis of the apparatus; and
(c) an ejection jack for actuating, via a linear actuator, the ejection hub wherein, upon the actuation of the ejection jack, the vertical rods move closer to one another; wherein, upon the actuation of the ejection assembly and the movable table, the movable table moves horizontally until a predetermined position at which point, the vertical rods move into the active position whereby, the vertical rods hold the work piece whereafter the work piece is pulled out of the bush hole upon the completion of the machining operations.

10. A machining apparatus for performing multiple back-to-back machining operations on a polyethylene cylindrical work piece, the apparatus comprising:
(a) a rotary fixture capable of rotation, the rotary fixture comprising:
(i) a proximal means for snugly holding a proximal portion of the work piece, the proximal means comprising:
(1) a circular needle bearing; and
(2) a circular bush comprising a through hole for snugly and firmly receiving the work piece therethrough, with the bush holding the proximal portion and wherein the bush is held by the bearing and is made out of a resilient material, and further wherein the circumferential surface of the hole is resilient; and
(ii) a distal means comprising a plurality of jaws capable of radial displacement, wherein the jaws hold the work piece;
(b) a movable table capable of movement along x, y and z axes, the movable table comprising:
(i) a blade holder for holding a plurality of blades, each of which is configured to a machining operation;
(ii) an insertion assembly disposed over the blade holder for pushing the work piece into the bush hole, the insertion assembly comprising:
(1) an insertion hub;
(2) a pair of insertion members, each of which comprises:
(a) an elongate insertion rod hingedly coupled to the insertion hub, the insertion rod adapted to be angularly movable between an active position, where the insertion rod is perpendicular to the length of the apparatus, and an inactive position, where the insertion rod is parallel to the length of the apparatus; and (b) an insertion plate disposed at the free end of the insertion rod such that, the outer surface of the insertion plate is vertically disposed; and (3) an insertion jack for actuating, via a linear actuator, the insertion hub wherein, upon the actuation of the insertion jack, the insertion rods move from the inactive position to an active position, wherein, upon the actuation of the insertion assembly and the movable table, the movable table moves horizontally till the insertion plates push the work piece into the bush hole till the bush hole holds the proximal portion of the work piece; and (iii) an ejection assembly disposed over the blade holder, for pulling the work piece out of the bush hole upon the completion of the machining operations, the ejection assembly comprising:

(1) an ejection hub;

(2) a pair of ejection members, each of which comprising: (a) a vertical rod; and (b) a pair of top and bottom support rods for supporting the vertical rod between the distal extremities thereof, the proximal extremity of the top support rod is hingedly coupled to the ejection hub while the proximal extremity of the bottom support rod is also hingedly coupled for allowing free angular movement as driven by the angular movement of the top support rod, the pair of top and bottom support rods adapted to be angularly movable between an active position, where the vertical rod is closer to the longitudinal axis of the apparatus, and an inactive position, where the vertical rod is further from the longitudinal axis of the apparatus; and (3) an ejection jack for actuating, via a linear actuator, the ejection hub wherein, upon the actuation of the ejection assembly and the movable table, the movable table moves horizontally until a predetermined position at which point, the vertical rods move into the active position whereby, the vertical rods hold the work piece whereafter the work piece is pulled out of the bush hole upon the completion of the machining operations;

wherein, the multiple machining operations are executed consecutively and as the work piece, by virtue of the rotation of the rotary fixture, is rotated, by virtue of the movement of the movable table, working against the rotating work piece.

11. The apparatus of claim 10, wherein the machining operations comprises turning, line boring, end cutting, internal grooving, and knurling of the inner surfaces of the work piece.

* * * * *